Dec. 8, 1931.     C. B. PAGE     1,835,610
STEAM POWER PLANT
Filed May 2, 1928
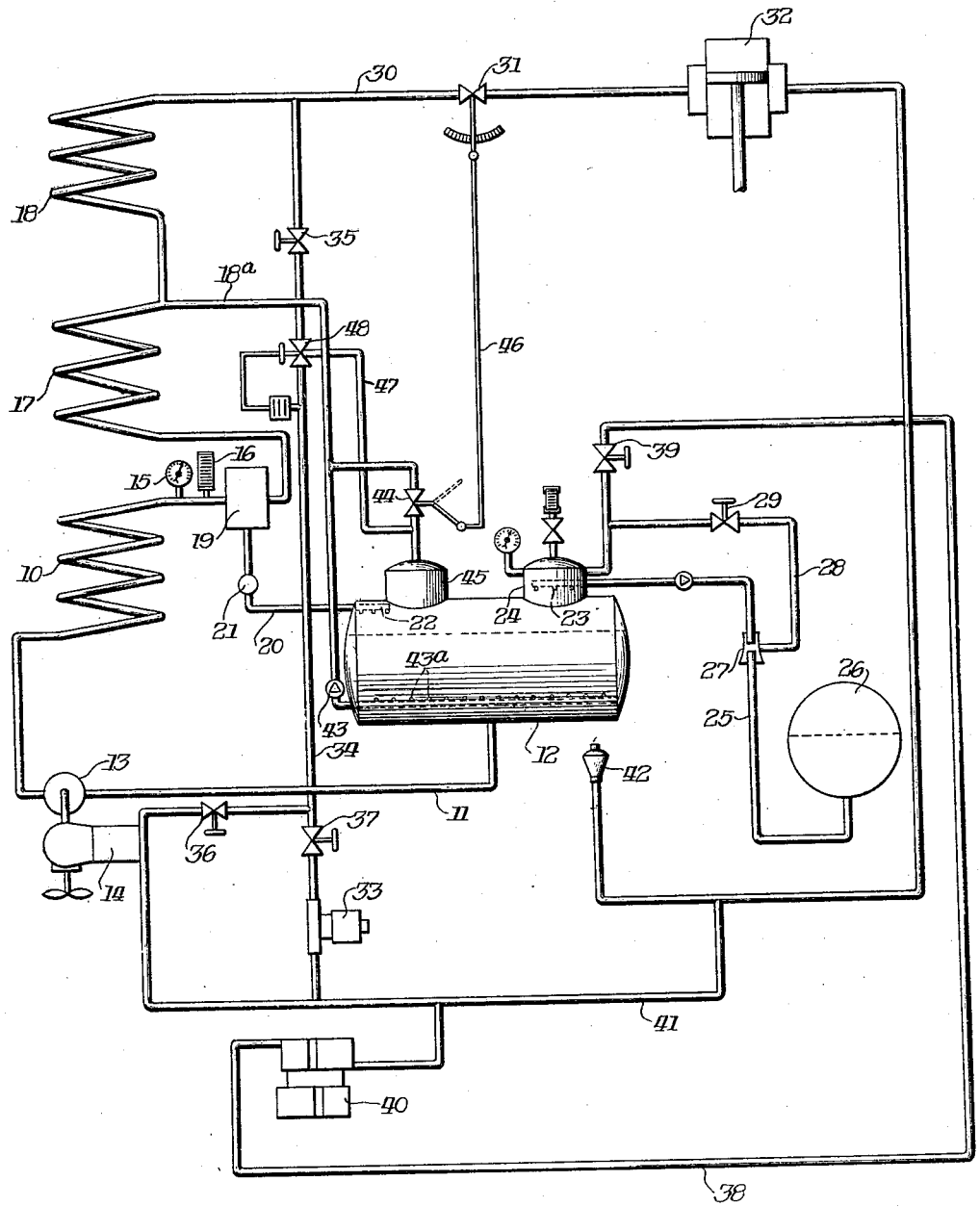
Inventor
Charles B. Page
By Chindahl Parker Carlson
Attys Patented Dec. 8, 1931

1,835,610

UNITED STATES PATENT OFFICE

CHARLES B. PAGE, OF EVANSTON, ILLINOIS, ASSIGNOR, BY MESNE ASSIGNMENTS, TO THE G. W. DULANY TRUST, OF CHICAGO, ILLINOIS, A COMMON LAW TRUST

STEAM POWER PLANT

Application filed May 2, 1928. Serial No. 274,427.

The present invention relates to improvements in steam power plants, particularly power plants adapted for heavy duty, as in automotive vehicles, rail cars and locomotives.

A general object of the invention resides in the provision of a novel steam power plant which is efficient and economical in operation, which has a high as well as a flexible power capacity, and which is adapted to many and varied applications or uses.

Another object resides in the provision in a power plant comprising a generator of a steam separator connected to the discharge of the generator and having a trap for removing the liquid collecting in the separator.

A further object resides in the provision of a power plant of the foregoing character in which a steam storage device is connected to the discharge of the trap.

Another object resides in the provision of a power plant of the foregoing character in which the separator is interposed between two units of a steam generator.

An important object resides in the provision of a steam power plant comprising a primary steam generator or superheater, a steam storage device, and a secondary superheater for receiving steam from either or both of said primary superheater or generator and said steam storage device.

Still another object resides in the provision in combination with a generator, a primary superheater, and a steam accumulator connected to the discharge end of the primary superheater of a steam separator interposed between the generator and the primary superheater with a steam trap opening to the accumulator, the pressure drop in the primary superheater being such that the pressure in the separator is higher than the pressure in the accumulator.

A further object resides in the provision of a steam power plant comprising primary and secondary superheaters connected in series, a steam supply line including a throttle valve connected to the discharge end of the secondary superheater, an accumulator, a line connecting the discharge end of the primary superheater and the inlet end of the secondary superheater to the accumulator, said line having a branch opening to the water space of the accumulator and a branch opening to the steam space including a valve operatively connected to the valve in the steam supply line to open first and to close last as the last mentioned valve is opened and closed.

Another object resides in the provision of thermostatically controlled means for admitting saturated steam from the accumulator to the steam supply line when the steam in the latter is at a temperature above a predetermined point.

Further objects and advantages will become apparent as the description proceeds.

In the accompanying drawing, the figure is a diagrammatic representation of a power plant embodying the features of my invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawing, 10 represents a steam generator which may be of any suitable type, and which in the present instance comprises a suitable coil.

The inlet end of the coil 10 is connected through a suitable feed water line 11 to an accumulator 12 which may be of any suitable form, and which in the present instance comprises a cylindrical drum adapted to contain a substantial body of water. The line 11 opens to the underside of the accumulator 12 and hence below the water level, and is adapted to convey water from the accumulator as feed water to the generator coil 10. To obtain a positive feed, a feed water pump 13 is interposed in the line 11. This pump may be driven by any suitable means, and in the present instance is connected to the suitable prime mover, such as a steam engine 14.

The discharge end of the generator coil 10 is provided with a suitable pressure gauge 15 and a suitable thermometer 16, and is connected to a primary superheater 17 which may be of any suitable form, and which in the present instance comprises a suitable coil. The discharge end of the primary superheater coil 17 is connected to a secondary superheater 18 which may be of any suitable form, and which in the present instance comprises a suitable coil, and is also connected through a line 18ª to the accumulator 12.

Any suitable means (not shown) may be provided for supplying fuel, such as fuel oil, and combustion air to means (not shown) for heating the coils 10, 17, and 18. Preferably, the coils are arranged in superimposed relation in the path of the products of combustion, the coil 18 being disposed in a relatively cool zone.

The pump 13 provides a forced circulation, and since the pressure in the generator coil 10 is but slightly higher than that in the accumulator 12 due to frictional resistance in the coil, it does not operate against the full pressure in the coil but merely against the frictional head. Preferably, the supply of feed water to the coil 10 is regulated in such a manner that a mixture of steam and water is delivered to the separator, thereby preventing the deposit of water soluble salts in the coil. When the gauge 15 and the thermometer 16 indicate that superheated steam is being discharged to the separator 12, the speed of the pump 13 may be increased to increase the supply of feed water, or the fire may be reduced.

Interposed between the generator coil 10 and the primary superheater 17 is a suitable steam separator 19 which preferably is connected through a line 20 to the accumulator 12. Interposed in the line 20 is a suitable steam trap 21 for preventing steam from escaping from the separator 19 through the line 20. Preferably, the line 20 opens to a spray 22 in the steam space of the accumulator 12. The construction of the primary superheater 17 has a pressure drop such that the pressure in the separator 19 is higher than the accumulator pressure. As a result, water collecting in the separator 19 is removed through the line 20 to the accumulator to add heat to the latter.

Any suitable means may be provided for replenishing the feed water supply. In the present instance, feed water may be supplied to the accumulator 12, and to this end a suitable spray 23 disposed in a dome 24 on the accumulator is connected through a feed water supply line 25 to a suitable storage tank 26. Preferably, the water in the tank 26 is softened, as by treatment with Zeolites so that it contains only water soluble salts and non-incrusting solids. Interposed in the line 25 is a suitable feed water injector 27 which is connected to the dome 24 through a steam line 28 under the control of a suitable throttle valve 29.

The present power plant is substantially a single pressure plant. Steam from the secondary superheater 18 may be supplied through a suitable steam supply line 30 controlled by a suitable throttle valve 31 to a prime mover such as an engine 32. Steam from the secondary superheater 18 may also be supplied to various auxiliary steam consumers, such as the engine 14 and a headlight turbo-generator 33 through a line 34 connected to the line 30 by a suitable valve 35. The supply of steam from the line 34 to the engine 14 and the turbo-generator 33 is controlled respectively by valves 36 and 37. Steam from the accumulator 12 may be supplied through a line 38 controlled by a suitable valve 39 to other auxiliaries, such as an air compressor 40. The prime movers 14, 32, 33, and 40 preferably exhaust into a common exhaust line 41 opening through a suitable exhaust head 42 to the atmosphere.

The accumulator 12 serves to absorb heat generated in excess of the demand, and to make up any deficiency in the supply of steam. To this end, the line 18ª has a branch opening through a check valve 43 to a spray 43ª in the accumulator 12 below the normal level of the liquid, the check valve preventing a back flow from the accumulator. The line 18ª also has a branch opening through a valve 44 to a dome 45 on the accumulator. This valve is operatively connected to the valve 31 by suitable linkage 46 which is operable to completely open the valve 44 upon initial actuation of and before opening of the valve 31, and to completely close the valve 44 upon final actuation and after closing of the valve 31. Means is provided for automatically connecting the steam space of the accumulator 12 to the line 34 when the steam passing therethrough is superheated in excess of a predetermined degree. This means comprises a line 47 in which is interposed a thermostatically controlled valve 48 responsive to temperatures in the line 34.

The operation will now be briefly described. In starting the plant from a cold condition, the accumulator is charged with steam from an outside source, such as a roundhouse, until the pressure is such that the auxiliary engine 14 can operate. Then water is circulated from the accumulator 12 through the steam generating coils back to the accumulator. When pressure is built up, wet or saturated steam is discharged from the generator coil 10 to the separator 19. If the gauge 15 and the thermometer 16 indicate that superheated steam is leaving the coil 10, either the feed water supply to the coil is increased or the fire is reduced. In the separator 19 the water is collected and the saturated steam passes on to the primary superheater 17. The water collecting in the separator 19 passes through the steam trap 21 to the accumulator, thereby imparting its heat to the water in the latter. The steam from the primary superheater 17 may pass either through the secondary superheater 18 to the main steam line 30 or through the line 18ª to the accumulator 12. If the valve 44 is open, steam will enter the steam space of the accumulator. The auxiliaries 14 and 33 normally take enough steam to protect the secondary superheater 18 from being overheated. If the steam leaving the secondary superheater 18 is too highly superheated for use in the auxiliaries, saturated steam from the accumulator will be automatically mixed therewith to reduce the degree of superheat. If there is a deficiency in the steam supply, steam may pass through the valve 44 and the line 18ª to mingle with the steam from the primary superheater 17 passing to the secondary superheater 18.

It will be evident that I have provided a simple, efficient, economical steam power plant, and that the plant has a highly flexible power capacity. The soluble salts will collect in the accumulator 12 from where they can be removed.

I claim as my invention:

1. A steam power plant having, in combination, an accumulator adapted to contain a body of water, a steam generator coil, means for supplying water from said accumulator to said generator coil, a superheater connected to the discharge of said generator coil, a steam separator interposed between said generator coil and said superheater, a line including a steam trap connecting said separator to said accumulator, a line connecting the discharge end of said superheater to said accumulator, and a check valve in said last mentioned line for preventing a return flow from said accumulator.

2. A steam power plant having, in combination, an accumulator adapted to contain steam and a body of water, a steam discharge line opening from said accumulator, a steam generator coil, means for supplying water from said accumulator to said generator coil, a superheater connected to the discharge of said generator coil, a steam separator interposed between said generator coil and said superheater, a line including a steam trap for withdrawing water collecting in said separator, and a line connecting the discharge end of said superheater to said accumulator.

3. A steam power plant having, in combination, an accumulator adapted to contain a body of water, a steam generator coil, means for supplying water from said accumulator to said generator coil, a superheater connected to the discharge end of said generator coil, a steam separator interposed between said generator coil and said superheater, a line including a steam trap connecting said separator to said accumulator, a line connecting the discharge end of said superheater to said accumulator, and a check valve in said last mentioned line for preventing a return flow from said accumulator, the pressure drop in said superheater being such that the pressure in said separator is normally in excess of the pressure in said accumulator.

4. A steam power plant having, in combination, an accumulator adapted to contain a body of water, a generator, a superheater connected to said generator, said superheater comprising a primary section and a secondary section, a steam supply line connected to the discharge end of said superheater, a valve member in said line, a line connected to said superheater between said sections and having two branches opening to the accumulator respectively below and above the normal water level, a check valve in the first branch for preventing a back flow from the accumulator, a valve in the other branch, and means for operatively connecting said last mentioned valve with said first mentioned valve so that said last mentioned valve will open first and will close last upon opening and closing said first mentioned valve.

5. A steam power plant having, in combination, an accumulator adapted to contain a body of water, a generator, a superheater connected to said generator, said superheater comprising a primary section and a secondary section, a steam supply line connected to the discharge end of said superheater, a valve member in said line, a line connected to said superheater between said sections and having two branches opening to the accumulator respectively below and above the normal water level, a valve in the branch line opening above the normal level of the water, and means for operatively connecting said last mentioned valve with said first mentioned valve so that said last mentioned valve will open completely before opening said first mentioned valve.

6. A steam power plant having, in combination, an accumulator adapted to contain a body of water, a generator, means for supplying water from said accumulator to said generator, a superheater connected to said generator, said superheater comprising two sections, a steam supply line connected to the discharge end of said superheater, a valve member in said line, a steam separator between said generator and said superheater, a line connected to said superheater between said sections and having two branches opening to the accumulator respectively below and above the normal water lever, and valves in said branch lines for permitting a flow of steam from said superheater to said accumulator below the water level and to permit steam from said accumulator to flow to said superheater.

7. A steam power plant comprising, in combination, an accumulator adapted to contain a body of water, a steam generator, a superheater connected to said generator, said superheater comprising a primary section and a secondary section, a steam separator interposed between said superheater and said generator, means for transmitting water collecting in said separator to said accumulator, a steam supply line connected to the discharge end of said superheater, a valve in said line, a line connected to said superheater between said sections and having two branches opening to said accumulator respectively below and above the normal water level, a check valve in the first branch for preventing the back flow from the accumulator, a valve in the other branch, and means for operatively connecting said last-mentioned valve with said first-mentioned valve so that said last-mentioned valve will open first and will close last upon opening and closing said first-mentioned valve.

8. A steam power plant comprising, in combination, an accumulator adapted to contain steam and a body of water, a steam discharge line opening from said accumulator, a generator, a superheater connected to said generator, a separator interposed between said generator and said superheater, means for transmitting water collecting in said separator to said accumulator, a steam supply line connected to the discharge end of said superheater, a line connected to said steam supply line and having two branches opening to said accumulator respectively below and above the normal water level, a check valve in the first branch for preventing a back flow from the accumulator, and a valve in the other branch.

9. A steam power plant comprising, in combination, an accumulator adapted to contain a body of water, said accumulator having two steam domes, a steam generator, means for supplying feed water from said accumulator to said generator, a superheater connected to said generator, a steam separator interposed between said generator and said superheater, means for transmitting water collecting in said separator to said accumulator, a steam supply line connected to the discharge end of said superheater, a line connecting said steam supply line to one dome of said accumulator, and means for admitting feed water to the other dome.

In testimony whereof, I have hereunto affixed my signature.

CHARLES B. PAGE.